US007566437B2

(12) United States Patent
Goia et al.

(10) Patent No.: US 7,566,437 B2
(45) Date of Patent: Jul. 28, 2009

(54) PROCESS FOR MANUFACTURE OF SILVER-BASED COMPOSITE POWDERS FOR ELECTRICAL CONTACT MATERIALS AND COMPOSITE POWDERS SO PRODUCED

(75) Inventors: Dan Goia, Potsdam, NY (US); Bernd Kempf, Kleinwallstadt (DE); Inge Fallheier, Linsengericht (DE); Roger Wolmer, Hanau Großauheim (DE); Andreas Koffler, Nidderau (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 151 days.

(21) Appl. No.: 11/395,328

(22) Filed: Mar. 31, 2006

(65) Prior Publication Data

US 2007/0228334 A1 Oct. 4, 2007

(51) Int. Cl.
*C01G 5/00* (2006.01)

(52) U.S. Cl. .......................... 423/604; 423/23; 423/42; 75/370; 252/500

(58) Field of Classification Search ................ 252/500; 75/351, 370; 423/23, 42, 604
See application file for complete search history.

(56) References Cited

U.S. PATENT DOCUMENTS 2,894,839 A * 7/1959 Matsukawa .................. 419/21
4,971,754 A 11/1990 Fontet et al.
5,773,733 A * 6/1998 Tuan et al. .................... 75/235
5,846,288 A 12/1998 Jost et al.
2005/0031870 A1* 2/2005 Liu et al. .................... 428/402

FOREIGN PATENT DOCUMENTS

DE 100 17 282 A1 12/1998
EP 0 370 897 5/1990

OTHER PUBLICATIONS

F. Heringhaus et al., "On the Improvement of Dispersion in Ag-SnO2 Based Contact Materials", ICEC Conference, Stockholm, 2000.
M. Poniatowski et al., 7th International Conference on Electrical Contacts, Paris, pp. 477-483, (1974).
Jeannot et al., IEEE Proceedings, Holm Conference, p. 51, (1993).

* cited by examiner

*Primary Examiner*—Mark Kopec
*Assistant Examiner*—Tri V Nguyen
(74) *Attorney, Agent, or Firm*—Kalow & Springut LLP

(57) ABSTRACT

The present invention relates to a method for manufacture of silver-based composite powders for electrical contact materials. The invention relates also to electrical contact materials made from such composite powders. The process comprises a high energy dispersing process of wet silver oxide ($Ag_2O$) with additional second oxide components in aqueous suspension. The high energy dispersing process can be conducted by high shear mixing or by high energy milling. Preferably high speed dispersing units working at rotating speeds in the range of 5,000 to 30,000 rpm or high energy mills such as attritor mills are used. The new process is versatile, economical and offers access to a broad spectrum of contact materials. The silver-based composite powders made according to the new process yield contact materials with a highly dispersed microstructures and superior material characteristics.

14 Claims, 1 Drawing Sheet

PROCESS FOR MANUFACTURE OF SILVER-BASED COMPOSITE POWDERS FOR ELECTRICAL CONTACT MATERIALS AND COMPOSITE POWDERS SO PRODUCED

BACKGROUND OF THE INVENTION

The present invention relates to a process for manufacture of silver-based composite powders for electrical contact materials. The invention relates also to electrical contact materials made from such composite powders.

Electrical contact materials typically consist of silver with certain metal and/or oxide additives. The materials are chosen based on the intended use, such as the type of switching device, the switching current, and the electrical load. General requirements include low electrical wear, with high arc resistance, and low welding force with low contact resistance.

Silver-based contact materials are predominantly used for switches which operate in air under low voltage and high current conditions. Their major function is to secure operating performance during a lot of switching cycles, for example for a motor controlling device.

Materials based on silver-tin oxide are frequently used for low voltage/high current equipment, within a switching range of 100-3,000 A. Contact materials of this type generally have acceptable arc resistance, sufficient safety with respect to contact welding, comparable low material migration with low contact resistance and good overtemperature behavior and practical processing properties.

The oxide components (i.e. the "second phase oxides") used are typically selected with the goal of improving the contact properties, thus reducing the specific contact erosion and improving the resistance against contact welding. Typical oxide additives used for silver-based contact materials include tin oxide ($SnO_2$), tungsten oxide ($WO_3$), molybdenum oxide ($MoO_3$). These oxides are chosen mainly based on their thermodynamic properties, as well as on their wetting behavior in the $Ag_{liquid}$/oxide system (ref to Jeannot et al, IEEE Proceedings Holm Conference 1993, p. 51).

Silver based electrical contacts are normally made by powder metallurgy methods starting from composite powder materials as precursors. These composite powders may comprise silver powder and/or silver oxide powder along with second oxide powders and optionally additives. Silver-based composite powders used as precursors for contact materials are typically made using one of the following processes:

- powder metallurgy mixing techniques;
- internal oxidation of alloying powders or compact bodies under elevated oxygen partial pressure; and
- chemically reductive precipitation of some or all of the components of the material.

Further processing of the composite powders to semi-finished contacts or contact units, as a rule, takes place by cold isostatic compaction of the powders ("CIP"), followed by sintering and wire extrusion, and reforming to the end size.

The powder metallurgy mixing techniques for producing composite powders comprise of mechanical homogenization of solid starting substances in powdered form in a mixer, for the most part using silver powder and/or silver oxide and the second oxide additive, but frequently also adding other additives or sintering aids. This method can be used either wet or dry, for instance with water etc, but is limited to relatively coarse powders.

The conventional mixing technique runs up against the technical limits in manufacturing composite powders having extremely fine oxide dispersion. This problem applies to dry mixing as well as to wet mixing methods.

According to F. Heringhaus et al (ref to article "On the improvement of dispersion in Ag—$SnO_2$ based contact materials," ICEC Conference, Stockholm, 2000), the minimum particle size for second oxides suitable for conventional dry and wet mixing techniques should be in the range of 1 to 2 μm (i.e., 1,000 to 2,000 nm). With finer particles, a homogeneous intermixing is causing problems due to agglomeration. Thus, a homogeneous, very finely dispersed microstructure of the silver-based contact material is very difficult to obtain.

For manufacturing of composite powders, wet chemical methods are known in the state of the art. EP 370 897 B1 discloses a process for manufacture of silver-tin oxide contact materials by a wet chemical method, wherein silver oxide is precipitated in the presence of tin oxide by adding a strong base. The precipitated silver oxide is subsequently heated to temperatures of 200-500° C. in order to reduce the silver oxide to metallic silver. The scope of this process is limited, since important additives and second phase oxides such as $WO_3$ or $MoO_3$ dissolve in a highly basic environment and thus do not reappear in the precipitated product. A specific mixing process is not disclosed.

DE 100 17 282 describes a process for producing composite powders based on silver-tin oxide by chemically reductive precipitation of silver onto particulate tin oxide whereby the silver compound and the reducing agent are simultaneously added. A conventional stirrer system is used. As the precipitation process takes place in a strongly acidic nitric acid environment, the second phase oxides (e.g., ZnO, $WO_3$ oder $MoO_3$) are attacked and dissolved. Therefore, the process cannot be used for manufacturing this type of contact materials.

In summary, the presently known processes for manufacture of composite powders for silver-based contacts are limited to specific oxide materials and are not sufficient in terms of broad applicability, process simplicity and cost. The manufacturing processes of composite powders for electrical contact materials with a homogeneous microstructure need further improvements.

It is therefore an objective of the present invention to provide an improved process for manufacture of silver-based composite powders suitable as precursors of electrical contact materials.

It is a further objective of the present invention to influence the processing and contact properties of silver-based contact materials, having essentially conventional compositions, by an appropriate design of the manufacturing process, with the goal of obtaining a maximum homogeneity and a highly dispersed microstructure of the finished contact material.

The process should be, for example, versatile, simple, economical and cost-effective.

These objectives are met by the processes and products of the present invention. Surprising improvements in the material and contact properties of silver-based contact materials are obtained.

SUMMARY OF THE INVENTION

The present invention relates to a method for manufacture of silver-based composite powders for electrical contact materials. The invention relates also to electrical contact materials made from such composite powders.

The process comprises a high energy dispersing process of wet silver oxide ($Ag_2O$) with additional second oxide components in aqueous suspension. The high energy dispersing process can be conducted by high shear mixing or by high energy milling. Preferably high speed dispersing units working at rotating speeds in the range of 5,000 to 30,000 rpm or high energy mills such as attritor mills are used.

The new process is versatile, economical and offers access to a broad spectrum of contact materials. The silver-based composite powders made according to the new process yield contact materials with a highly dispersed microstructures and superior material characteristics.

For a better understanding of the present invention, reference is made to the following description taken in conjunction with the examples and figure.

DETAILED DESCRIPTION OF THE INVENTION

Figure 1:
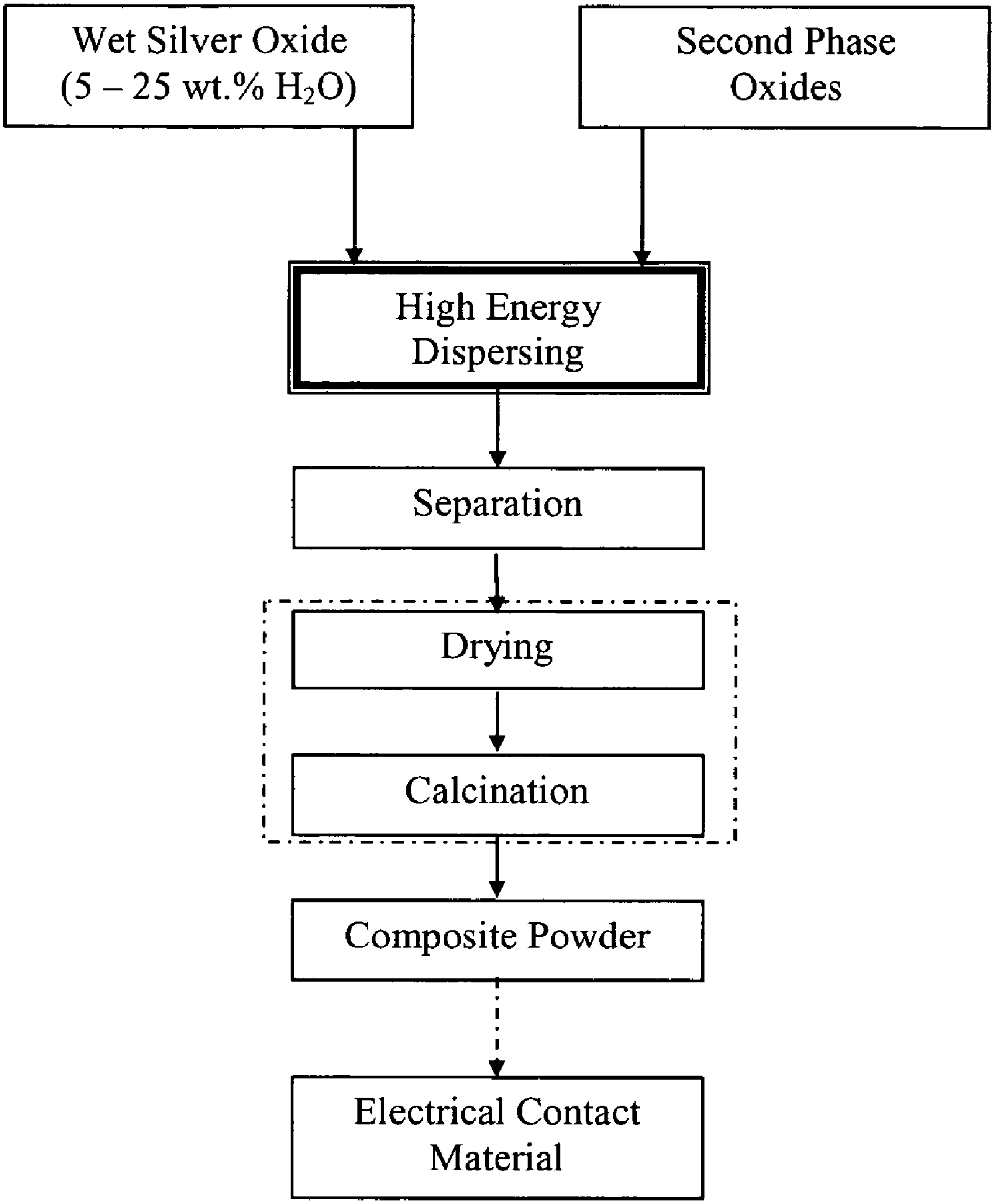
FIG. 1: A schematic drawing of an example of a process of the present invention.

In preparing the preferred embodiments of the present invention, various alternatives may be used to facilitate the objectives of the invention. These embodiments are presented to aid in an understanding of the invention and are not intended to, and should not be construed to, limit the invention in any way. All alternatives, modifications and equivalents that may become obvious to those of ordinary skill upon a reading of the present disclosure are included within the spirit and scope of the present invention.

The present invention discloses a process for producing a composite powder for electrical contact materials, comprising a high-energy dispersing process of wet silver oxide ($Ag_2O$) with additional second phase oxide components in aqueous suspension. This high-energy dispersing process comprises a high-shear mixing process or, alternatively, a high-energy milling process. In both alternative embodiments, wet silver oxide ($Ag_2O$) is used as a starting material.

In the following, the process of the invention is characterized in further detail.

The required wet silver oxide ($Ag_2O$) can be prepared from a commercially available aqueous silver nitrate solution ($AgNO_3$). By addition of a strong base (NaOH or KOH), silver oxide ($Ag_2O$) is precipitated in form of an aqueous alkaline suspension. After washing and removal of nitrate ions, the material is separated to yield a wet $Ag_2O$ powder. The $Ag_2O$ starting material may additionally comprise various amounts of hydroxy groups (in form of AgOH) and/or carbonate groups (in form of $Ag_2CO_3$, $AgHCO_3$), depending on the preparation process.

Generally, wet $Ag_2O$ should be used in the high-energy dispersing process of the present invention in order to facilitate deagglomeration of the $Ag_2O$ particles in the subsequent dispersing process. It was found that the use of wet $Ag_2O$ as a starting material in combination with the application of high-energy dispersing yields the best results.

Suitable contents of residual moisture in the $Ag_2O$ starting material are in the range of 5 to 25 wt.-% water, preferably in the range of 10 to 20 wt.-% of water, based on the total weight of $Ag_2O$.

It was found that high shear forces should be applied to achieve homogeneous mixing of the wet $Ag_2O$ with the additional components.

In the first embodiment of the process, this is obtained by use of specific high shear mixing devices, which work at high speed. Such high speed dispersers may consist of a driven vertical shaft and a high shear disk type blade, which rotates at very high speed and creates a radial flow pattern within a stationary mixing vessel. Such devices are frequently referred to as "dissolver units".

Preferably, the dispersing generator of the dispersing unit comprises of a rotor/stator system. As an example, the dispersing head may consist of two sets of concentric teeth rings. One of them is fixed and does not move—the stator; the other is driven by a motor through the shaft and turns around inside the stator—the rotor. The shear forces and bounce effects which are created between the running rotor and the stator treat the product mechanically. From various manufacturers, rotor/stator systems with two, three or even four sets of concentric teeth rings are commercially available. Examples for suitable high shear mixers based on the rotor/stator principle are high shear dispersers, made for example by Silverson Machines Inc. or Ross Corp.

A particularly suitable device is the dispersing unit "Polytron PT" manufactured by Kinematica, CH-6014 Littau-Luzern (Switzerland). This device is characterized by a rotor/stator head with a diameter of 60 mm, comprising of three teeth rings. The high shear mixing system applies very high shear forces to the water/oxide powder suspension and thus generates a homogeneous mixture of the components, even when using very fine second oxide powders.

Generally, suitable mixing devices for the process may rotate at very high speed in the range of 5,000 to 30,000 rpm, preferably in the range of 5,000 to 20,000 rpm.

In the second embodiment of the process, high energy attritor mills, vibration energy mills, pearl mills and/or ball mills may be used. In parallel to the mixing process, a certain milling and deagglomeration effect is obtained here due to the presence of grinding media. Preferably, attritor mills may be used; however, the type of grinding media must be carefully selected in order to prevent contamination of the composite powder by ingredients of the grinding media. Ceramic grinding media, based for example on zirconia, are preferred.

A schematic drawing of an example of the process of the present invention is shown in FIG. 1. The high-energy dispersing step of the starting components (wet silver oxide and second phase oxides) is conducted in aqueous suspension for time periods of 5 to 90 minutes, preferably in a two- or multi-stage process using different rotating speeds. The temperature in the mixing vessel is held in the range of 20 to 60° C., excess heating of the mixture should be avoided.

Mixing vessels made of stainless steel, plastics, polyethylene, etc. with sizes of 3 to 50 L are preferably used. Due to environmental reasons, aqueous suspensions are preferred; however, organic additives, such as dispersing aids, surfactants, co-solvents etc may be added in small amounts.

Furthermore, the high-energy dispersing process (i.e. the high shear mixing/high energy milling processes) described in the present invention may also be applied in a continuous way by use of continuous, in-line manufacturing equipment and suitable mixing devices.

From the resulting aqueous suspension, the solids are then separated by conventional separation techniques (e.g. by filtering, settling, centrifuging, filter press etc.). After drying and calcination in air, a composite powder is obtained.

Drying of the composite powder is done at temperatures in the range of 50 to 100° C. in air; calcination of the composite powder is performed in air to decompose the silver oxide to metallic silver; suitable temperatures are in the range of 300 to 500° C. for periods of 0.5 to 3 hours; conventional furnaces and batch ovens may be used. The drying and the calcination processes may also be combined into a one-step heat treatment process using a suitable furnace at different temperatures. After drying and calcination in air, the silver-based composite powder is obtained.

Further processing of the composite powder into semi-finished contacts or contact units generally takes place as well known to the persons skilled in the art.

Typical second phase oxides used for silver-based contact materials include tin oxide ($SnO_2$), zinc oxide (ZnO), tungsten oxide ($WO_3$), molybdenum oxide ($MoO_3$), bismuth oxide, ($Bi_2O_3$), copper oxide (CuO) and indium oxide ($In_2O_3$), used individually or in combination with each other. For conventional electrical contacts, materials comprising about 2 to 15 wt.-%, preferably 8 to 12 wt.-% of second oxide phases reveal the optimum switching performance. 12 wt.-% of tin oxide corresponds to a volume ratio of about 17 vol.-% of tin oxide in the silver-based material. The term "second phase oxides" may include additional dopants, inorganic or organic additives as well as various sintering aids.

For good results, the second oxide powders used in the process of the invention should have a medium particle size (d50-value) in the range of 400 to 1,000 nm and a d10-value in the range of 150 to 250 nm. Very good results are obtained with tin oxide having a medium particle size (d50-value) of 750 nm.

With the method according to the present invention, the individual components of the composite powder are intimately mixed together; thus it is possible to manufacture silver-based contact materials having a very highly dispersed microstructure.

By the present invention, silver-based contact materials can be produced as homogeneous composite materials, revealing medium inter-particle distances for the oxide particles below 500 nm, preferably below 300 nm. With conventional methods, particularly when using the dry mixing technique, this finely dispersed microstructure cannot be obtained.

In addition to that, the degree of fineness of the microstructure can be tailored by adjusting the process parameters within broad ranges. Basically, the fineness of the material is limited by two factors: the grain size of the particles itself, which are mixed together as well as the ability to really deagglomerate the particles into the fine primary particles (as far as they are fine enough). Metallic silver powders made by melt atomization, as used generally for dry mixing, are too coarse at all for such fine structures. To the contrary, very fine silver particles, for example made by chemical processes, are heavily agglomerated and thus do not allow a homogeneous mixing with the second phase oxides. Additionally, the very fine second oxide phase and also the dry silver oxide particles do not deagglomerate sufficiently in a standard dry mixing process and therefore do not generate the above defined fine homogeneous structure.

As a major advantage over all other previously known chemical processes, this method allows to employ all suitable second phase oxide materials, as there is no limitation in chemical stability in solutions with low or high pH-values, as it is the case for the chemical precipitation technologies.

It should be emphasized that the process of the present invention is not only suitable for manufacture of contact materials with a very highly dispersed microstructure (which cannot be produced by standard powder metallurgy methods), it may also be used for manufacture of contact materials with coarser structures, which are normally produced by standard methods. In this case, coarser second phase oxide materials with medium particle sizes (d50-values) in the range of 1 to 6 μm (i.e., 1,000 to 6,000 nm) may be used.

Thus, compared to the currently known methods, the present invention offers access to an enlarged material spectrum for electrical contacts. The process is very economical and cost-effective as various types of composite powders containing various second oxide phases can be manufactured in one single production unit.

Analytical Methods

The medium and maximum particle size (d50 and d100 values) and the particle size distribution was detected by high magnification Transmission Electron Microscopy (TEM) or by Scanning Electron Microscopy (SEM). Such methods are well known in the state of the art.

In certain cases, values for particle size distribution (PSD) of starting powders were obtained by laser granulometric methods in an aqueous medium (e.g. CILAS).

Conventional X-ray diffraction (XRD) was applied for particle characterization and composition analysis. The silver content of the products was determined by standard analytical methods. For quantitative analysis of Ag, a volumetric titration method was used.

The present invention is illustrated by the following examples. These are merely illustrative and should not be construed as limiting the scope of the invention.

EXAMPLE 1

Preparation of Silver-Tin Oxide Composite Powder by High Shear Mixing (Composition: 90 wt.-% Ag, 7.2 wt.-% $SnO_2$, 2.3 wt.-% $In_2O_3$, 0.5 wt.-% CuO)

The following components are weighed into a PE bucket filled with approx. 12 L DI water:

| | |
|---|---|
| $Ag_2O$ (res. moisture: 12 wt.-% $H_2O$): | 1,624.0 g (= 1,350 g Ag) |
| $SnO_2$ (d50 = 750 nm): | 108.0 g |
| $In_2O_3$ (d50 = 800 nm): | 34.5 g |
| CuO (d50 = 850 nm): | 7.5 g |

$Ag_2O$ was prepared from a commercially available $AgNO_3$ solution, the residual moisture content of $Ag_2O$ was 12 wt.-% $H_2O$.

For preparing the suspension by high shear mixing, the mixture was dispersed with the Kinematica device (conditions: starting temperature 25° C., 20 mins at 7,200 rpm, then 5 mins at 9,600 rpm; end temperature 45° C.).

The aqueous suspension was then filtered off and dried overnight at 70° C. in air. Thereafter, the composite powder was heat-treated for 2 h at 390° C. in order to reduce the silver oxide ($Ag_2O$) to metallic silver. Then the powder was screened through a 200 mesh screen to destroy agglomerates formed during drying.

Further processing of the composite powder was done by cold isostatic pressing (CIP) at 800 bar, followed by sintering at 880° C. and extruding the sintered product to a wire of 5 mm diameter. Subsequently, this wire was drawn down to 1.37 mm thickness and reformed to a switching tip.

The mechanical characteristics of the material are given in Table 1, data for specific contact erosion are listed in Table 2.

EXAMPLE 2

Preparation of Silver-Tin Oxide Composite Powder by High Energy Milling (Attritor) (Composition: 88 wt.-% Ag, 11.6 wt.-% $SnO_2$, 0.4 wt.-% $WO_3$)

The following components are weighed separately:

| | |
|---|---|
| $Ag_2O$ (res. moisture: 11 wt.-% $H_2O$): | 735.0 g (= 616 g Ag) |
| $SnO_2$ (d50 = 750 nm): | 81.2 g |
| $WO_3$ (d50 = 900 nm): | 2.8 g |

$Ag_2O$ was used with a residual moisture content of 11 wt.-% $H_2O$. The equipment used for high energy milling was a bench type Szegvary attritor, model 01-HD, manufactured by Union Process, Akron, Ohio, USA. In order to eliminate the contamination of the samples with iron, a ceramic milling tank/agitator assembly was used. The milling media consisted of yttrium stabilized zirconia balls. The jacketed milling tank was connected to a constant temperature bath, which maintained the temperature at 19° C. through the entire milling process.

The attritor was first loaded with 300 mL DI water. The required amount of Silver—and tin oxides was then gradually added and mixed at 250 rpm. After 15 minutes of mixing the speed of the attritor was increased to 400 rpm. After two hours the remainder of the metal oxides was added into the attritor and the milling was continued for an additional hour. The total amount of slurry (including zirconia balls) was about 1.8 L.

At the end of the milling process, the batch was discharged and the milling media were rinsed using DI water. The drying and calcination step was performed as described in Example 1.

Further processing of the composite powder was done by cold isostatic pressing (CIP) at 800 bar, followed by sintering at 880° C. and extruding the sintered product to a wire of 5 mm diameter. Subsequently, this wire was drawn down to 1.37 mm thickness and reformed to a switching tip.

The mechanical characteristics of the material are given in Table 1, data for specific contact erosion are listed in Table 2.

Comparative Example 1 (CE1)

Preparation of Silver/Tin Oxide Composite Powder by Conventional Wet Mixing (Composition: 90 wt.-% Ag, 7.2 wt.-% $SnO_2$, 2.3 wt.-% $In_2O_3$, 0.5 wt.-% CuO)

The following components are weighed into a PE bucket filled with approx. 12 L DI water:

| | |
|---|---|
| Ag powder (atomized, d50 = 25 μm): | 1,350.0 g |
| $SnO_2$ (d50 = 750 nm): | 108.0 g |
| $In_2O_3$ (d50 = 800 nm): | 34.5 g |
| CuO (d50 = 850 nm): | 7.5 g |

About 1.5 L of DI water was added and all components were mixed for 20 mins at 1,000 rpm using a standard mixer made by MTI (Mischtechnik International, D-32758 Detmold, Germany.) The mixture was then dried overnight at 70° C. in air and screened through a 200 mesh screen.

The composite powder thus prepared was treated by cold isostatic pressing (CIP) followed by sintering and extrusion to a wire of 5 mm diameter. Manufacture of a thin wire with 1.37 mm diameter was not possible. Thus, the extruded wire had to be used for determination of the material characteristics (ref to Table 1).

Comparative Example 2 (CE2)

Preparation of Silver/Tin Oxide Composite Powder by Conventional Dry Mixing (Composition: 88 wt.-% Ag, 11.6 wt.-% $SnO_2$, 0.4 wt.-% $WO_3$ The following components are weighed separately:

| | |
|---|---|
| $Ag_2O$ (dried, <200 mesh): | 6,528 g (= 6,071 g Ag) |
| $SnO_2$ (d50 = 750 nm): | 800 g |
| $WO_3$ (d50 = 900 nm): | 28 g |

The mixing was done with a laboratory mixing equipment, type R02 from G. Eirich Co., D-74732 Hardheim (Germany). This mixer type consists of a rotating mixing pot with a stirrer inside. All components were weighed together in the mixer and mixed for 20 mins at 2,000 rpm (stirrer speed), while the mixing pot was slowly rotating. Further processing steps (CIP, sintering, extrusion) were done as described in Example 1.

The extruded wire broke already at an elongation of less than 3% ductility. Metallographic investigations of the extruded material showed in homogenities in form of Ag-isles and rather big agglomerates of Sn-oxide. A homogeneous microstructure could not be obtained. As the workability of this material was too poor, no switching tests were conducted.

Comparative Material Data

Table 1 shows material data for silver-tin oxide contact materials based on composite powder made in accordance with the process of the present invention (Examples 1 and 2) compared to contact materials made from composite powder using a conventional wet mixing technique (Comparative Example 1, CE1) and a conventional dry mixing technique (Comparative Example 2, CE2).

As can be seen from the table, the silver-tin oxide contact materials made from composite powder prepared according to the present invention reveal a significantly higher breaking elongation (in %) and thus a better workability at similar breaking strength (in MPa) compared to the reference materials using standard composite powders.

Additionally, it should be noted that the wire prepared from the CE1 material was very brittle; thus, a fine wire could not be produced. Contact tips were made from the thicker wire.

As the workability of the material made from Comparative Example 2 (CE2) was very poor; no switching tests were performed, thus no values for the specific contact erosion are reported in Table 2.

TABLE 1

Selected data for silver-tin oxide contact materials

| Material | Wire diameter [mm] | Breaking elongation [%] | Breaking strenght [MPa] |
|---|---|---|---|
| Example 1 | 1.37 | 29 | 296 |
| Example 2 | 1.37 | 24 | 303 |
| Comparative Example (CE 1) | 5 | 6.3 | 287 |

TABLE 1-continued

Selected data for silver-tin oxide contact materials

| Material | Wire diameter [mm] | Breaking elongation [%] | Breaking strenght [MPa] |
|---|---|---|---|
| Comparative Example (CE 2) | 5 | <3 | 266 |

The specific contact erosion (SCE) is decisive for the long-term stability and lifetime of the contact material. For measurement of the SCE, the model switches and methods described by M. Poniatowski et al., $7^{th}$ International Conference on Electrical Contacts, Paris 1974, pages 477-483, were applied.

The specific contact erosion of the contact material was calculated by the quotient of weight loss of the contact tips (in μg) and the electric arc energy (in Ws):

$$SCE = \frac{\text{weight loss of contact material (in } \mu g)}{\text{electric arc energy (in } Ws)}$$

As can be seen from Table 2, the specific contact erosion of the contact materials made according to the present invention is markedly lower compared to the reference contact materials containing the composite powder made with the conventional processes, thus indicating improved material properties. Additionally, the new materials show excellent resistance against contact welding.

TABLE 2

Specific contact erosion (comparative data)

| Material | Contact erosion [μg/Ws] |
|---|---|
| Example 1 | 0.25 |
| Example 2 | 0.28 |
| Comparative Example 1 (CE 1) | 0.47 |
| Comparative Example 2 (CE 1) | n/a |

The results of Table 1 and Table 2 clearly demonstrate the advantages of the process according to the invention compared to conventional processes. Thus, the superiority of the high energy dispersing process of the present invention is clearly demonstrated.

While the invention has been described with reference to specific embodiments thereof, it should be understood that the invention is capable of further modifications and that this application is intended to cover any and all variations, uses, or adaptations of the invention which follow the general principles of the invention. All such alternatives, modifications and equivalents that may become obvious to those of ordinary skill in the art upon reading the present disclosure are included within the spirit and scope of the invention as reflected in the appended claims.

What is claimed:

1. A method for producing a silver-based composite powder for electrical contact materials, comprising a high-energy dispersing process of wet silver oxide ($Ag_2O$) with additional second phase oxides in aqueous suspension, wherein the wet silver oxide ($Ag_2O$) has a residual moisture content in the range of 5 to 25 wt.-% water (based on the total weight of $Ag_2O$) and wherein the wet silver oxide ($Ag_2O$) is prepared by precipitation from an aqueous silver nitrate solution ($AgNO_3$) by the addition of a strong base.

2. The process according to claim 1, wherein the high-energy dispersing process is performed by high shear mixing at rotating speeds in the range of 5,000 to 30,000 rpm.

3. The process according to claim 1, wherein the high-energy dispersing process is performed with a dispersing unit comprising a rotor/stator system.

4. The process according to claim 1, wherein the high-energy dispersing process is performed by high shear mixing at rotating speeds in the range of 5,000 to 30,000 rpm with a dispersing unit comprising a rotor/stator system.

5. The process according to claim 1, wherein the high-energy dispersing process is performed by high-energy milling using attritor mills, vibration energy mills, pearl mills or ball mills.

6. The process according to claim 5, wherein ceramic grinding media are used.

7. The process according to claim 1, wherein the wet silver oxide ($Ag_2O$) has a residual moisture content in the range of [5 to 25 wt.-% water, preferably in the range of] 10 wt.-% to 20 wt.-% water (based on the total weight of $Ag_2O$).

8. The process according to claim 1, wherein the second phase oxides are selected from the group consisting of tin oxide ($SnO_2$), zinc oxide (ZnO), tungsten oxide ($WO_3$), molybdenum oxide ($MoO_3$), bismuth oxide, ($Bi_2O_3$), copper oxide (CuO), indium oxide ($In_2O_3$) and mixtures and combinations thereof.

9. The process according to claim 1, wherein the second phase oxides have a medium particle size (d50-value) in the range of 400 to 1,000 nm.

10. The process according to claim 1, wherein the second phase oxides comprise additional dopants, inorganic or organic additives and/or sintering aids.

11. The process according claim 1 further comprising a separation step to separate the composite powder from the aqueous suspension.

12. The process according to claim 1 further comprising a drying step at temperatures in the range of 50 to 100° C.

13. The process according to claim 1 further comprising a calcination step at temperatures in the range of 300 to 500° C. to decompose the silver oxide ($Ag_2O$) to metallic silver.

14. The process according to claim 13, wherein the calcination step is combined with a drying step at temperatures in the range of 50 to 100° C. into a one-step heat treatment procedure.

* * * * *